Patented Nov. 7, 1950

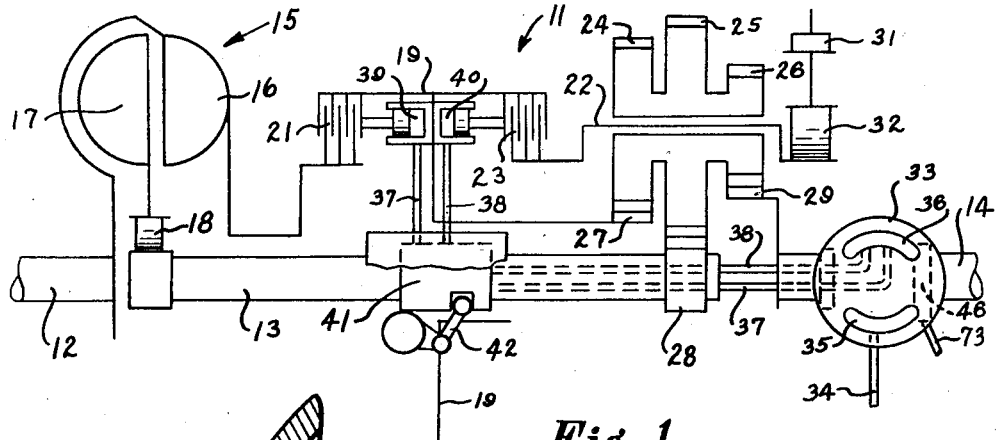
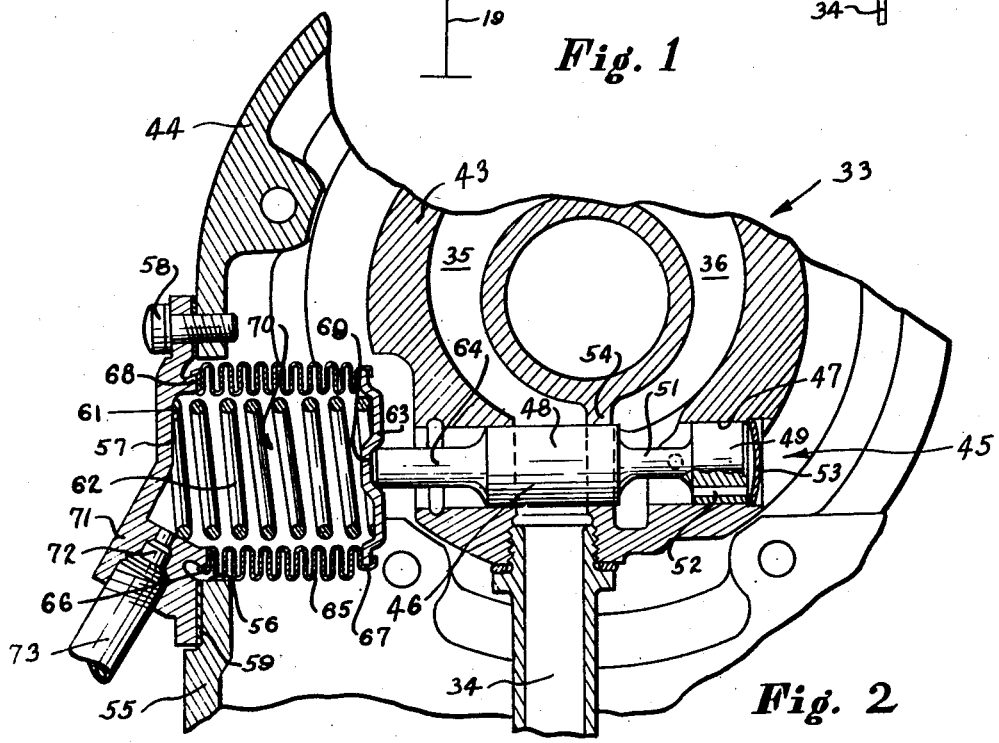
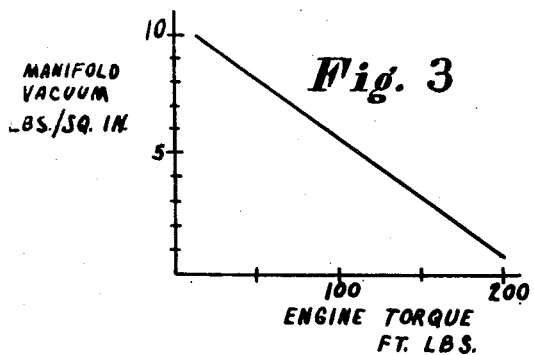
Eugene J. Farkas
Joseph W. Rackle
INVENTORS

2,528,585

UNITED STATES PATENT OFFICE 2,528,585

OIL PRESSURE CONTROL FOR AUTOMATIC TRANSMISSIONS

Eugene J. Farkas and Joseph W. Rackle, Detroit, Mich., assignors to Ford Motor Company, Dearborn, Mich., a corporation of Delaware Application November 3, 1945, Serial No. 626,562

15 Claims. (Cl. 74—752)

1

This invention relates generally to a transmission; and, more particularly, to oil pressure control means for an automatic transmission.

The present invention comprises an improvement of the automatic transmission disclosed in the copending application of Eugene J. Farkas, Serial No. 611,975, filed August 22, 1945. The transmission of the said copending application includes a multiple planetary gearing system adapted to transmit torque at three different speed ratios, with the transition from first to second speed, and from second to third speed, taking place automatically by the operation of second and third speed clutches which are activated by fluid under pressure supplied by a fluid pump and regulated by governor controlled hydraulic valve means. In this construction a pressure relief valve was provided in the pump, and functioned to prevent the pressure from building up beyond a certain definite predetermined amount. This was accomplished by providing a spring loaded valve having one end exposed to the pressure in the pressure chamber of the pump, and movable against the spring to a position establishing temporary communication between the pressure and intake chambers of the pump when the pressure reached the predetermined amount.

With the construction in the above-mentioned copending application, the maximum predetermined oil pressure was maintained in the system under all normal operating conditions. When the transmission clutches are operating under full torque, this maximum oil pressure is required; but as the load or torque decreases, the full pressure is not needed to operate the clutches and is, in fact, not desirable. With lower clutch torque requirements, a lower oil pressure is desired to prevent unnecessary abrupt and harsh shifting of the transmission.

It is therefore an object of the present invention to provide, in an automatic transmission, means for automatically controlling the operating fluid pressure in accordance with torque requirements.

Another object is to provide an automatic transmission with oil pressure control means arranged to provide a maximum predetermined pressure at full torque and a progressively decreasing pressure as the torque decreases.

A further object of the invention is to provide an oil pressure control for an automatic transmission in which a variable pressure is obtained in accordance with the transmission torque by the utilization of vacuum power supplied from the engine manifold.

2

Still another object is to provide a pressure relief valve for controlling the fluid pressure supplied by a pump to the operating mechanism of an automatic transmission, in which the valve is spring loaded and in which the action of the spring is modulated by vacuum powered means.

Other objects and advantages of the present invention will be made more apparent as this description proceeds, particularly when considered in connection with the accompanying drawings, in which:

Figure 1 is a longitudinal vertical schematic drawing of the transmission.

Figure 2 is a transverse cross sectional view taken through the fluid pump and oil pressure control means of the transmission.

Figure 3 is a graph showing the relationship between manifold vacuum pressure and engine torque.

It will be noted that the general construction of the transmission is shown schematically in the drawing, reference being made to the above-mentioned copending application, Serial No. 611,975, for a more detailed description and illustration of the mechanism.

Referring now to the drawing, the reference character 11 indicates generally an automatic transmission having a drive shaft 12 connected to the crankshaft of the engine, a main shaft 13, and a load shaft 14 adapted to be connected to the rear axle drive means. The transmission includes a fluid coupling 15 having an impeller 16 driven by the drive shaft 12, and a runner 17 connected to the main shaft 13 by the overrunning clutch 18.

The impeller 16 of the fluid clutch is adapted to be operatively connected to a clutch carrier 19 by a disc clutch 21, known as the second speed clutch. The clutch carrier 19 is also adapted to be locked to the planet carrier 22 by means of a disc clutch 23, known as the third speed clutch. The second and third speed clutches are adapted to be actuated automatically by hydraulic mechanism to be described later.

The planet carrier 22 is mounted for rotation about the axis of the main shaft 13 and carries clusters of planet pinions 24, 25, and 26. Planet pinion 24 is adapted to mesh with a sun gear 27 carried by the clutch carrier 19. Planet pinion 25 meshes with a sun gear 28 mounted on the main shaft 13, and plant pinion 26 with sun gear 29, the latter being carried by the load shaft 14. Reverse rotation of the planet carrier 22 can be selectively prevented by means of the forward speed brake 31, operating through the overrunning clutch 32.

Fluid pressure for operating the second and third speed clutches is provided by a fluid pump 33 driven by the load shaft 14. Fluid is supplied from the transmission sump (not shown) through the intake tube 34 to the intake chamber 35 of the pump 33, and is delivered under pressure by the pump to the pressure chamber 36. Conduits 37 and 38 communicate with the pressure chamber 36 of the pump and deliver fluid under pressure to the clutch actuating cylinders 39 and 40 for the second and third speed clutches 21 and 23, respectively. A hydraulic valve 41 is mounted concentrically with the main shaft 13 and controls the flow of fluid through the conduits 37 and 38. The position of the valve is controlled by a centrifugal governor 42 mounted on the clutch carrier 19.

In low or first speed, the governor controlled valve 41 blocks the flow of fluid to conduits 37 and 38 and, accordingly, neither the second speed clutch 21 nor the third speed clutch 23 are operated. Under these conditions, power is transmitted from the drive shaft 12 through the fluid coupling 15 to the main shaft 13, and thence to sun gear 28, planet pinions 25 and 26, and sun gear 29 to the load shaft 14, driving the latter in the forward direction at low or first speed.

As the rotational speed of the clutch carrier 19 increases with an increase in the speed of the load shaft 14, the transmission is automatically shifted to second speed. This is accomplished by valve 41 which is displaced by the centrifugal governor 42 and establishes fluid communication through the conduit 37 to the second speed clutch 21. Operation of the second speed clutch locks the drive shaft 12 and impeller 16 of the fluid coupling to the clutch carrier 19 which, in turn, drives its sun gear 27 and the triple planetary pinion through the pinion 24. The drive is again taken from the planet pinion 26 to the sun gear 29 on the load shaft 14, driving the latter at an intermediate or second speed ratio.

With a further increase in the rotational speed of the clutch carrier 19, the governor controlled valve 41 is effective to establish fluid communication between conduit 38 and the third speed clutch 23, while at the same time maintaining communication between conduit 37 and the second speed clutch 21. Actuation of the third speed clutch 23 results in the rotation as a unit of the clutch carrier, planet carrier, and the triple planetary pinion. Accordingly, a direct drive is established from the drive shaft 12 to the load shaft 14, transmitting torque at engine speed in the forward direction.

From the foregoing, it will be seen that clutches 21 and 23 are automatically operated by fluid pressure supplied by the pump 33, effecting an automatic transition between first, second, and third speeds.

Referring to Figure 2, the fluid pump 33 is shown in section, and comprises a pump housing 43 carried within the rearward end of the transmission casing 44. Interposed in the pump housing 43 between the intake chamber 35 and the pressure chamber 36 is a pressure relief valve 45, which prevents the pressure in chamber 36 from building up beyond a certain amount, by establishing temporary communication between the pressure and intake chambers 36 and 35, respectively.

The pressure relief valve 45 comprises a reciprocable plunger 46 slidable within a horizontal bore 47 formed in the pump housing 43. Intermediate the body 48 and the head 49 of the valve plunger is a section 51 of reduced diameter. It will be noted that in the retracted position of the plunger, as shown in Figure 2, the annular groove surrounding the section 51 is in communication with the pressure chamber 36. A passage 52 extends longitudinally through the head 49 of the plunger and admits fluid under pressure from the pressure chamber 36 into the cavity formed between the head 49 of the plunger and the Belleville washer 53 closing the right-hand end of the bore 47. This pressure acts upon the outer end of the head 49 and tends to move the plunger to the left in the bore 47.

A relatively narrow partition 54 separates the pressure and intake chambers 36 and 35, respectively, of the fluid pump. In the retracted position of the valve plunger, the bore 47 in the region of the partition 54 is closed by the valve body 48, separating the pressure and intake chambers. When the valve plunger is moved sufficiently to the left, under the action of the fluid pressure generated by the pump, communication is established between the pressure and intake chambers through the annular chamber surrounding the reduced section 51 of the valve plunger. This temporarily short-circuits the pump and reduces the pump pressure. By properly spring loading the valve plunger, the pressure in chamber 36 can be maintained at any desired predetermined amount. The automatic shifting of the transmission from one speed ratio to another can be accomplished, however, smoother and more efficiently under varying conditions of torque when the pressure of the activating fluid is varied in accordance with the torque requirements. When the transmission is operating at a lower torque, less fluid pressure is required to actuate the second and third speed clutches 21 and 23, respectively. A higher fluid pressure than is necessary will result in impairing the smoothness of the clutch engagement, resulting in an abrupt and harsh shift from one speed ratio to another. Under any given operating condition, the fluid pressure supplied by the pump to the clutch operating cylinders should be just sufficient to prevent the clutch from slipping under the particular torque to be transmitted. Thus, a variable fluid pressure, modulated in accordance with the torque requirements, is desired. This is accomplished by the present construction.

The wall 55 of the transmission casing 44 is provided with a relatively large opening 56 in alignment with the axis of the valve plunger 46. The opening 56 is closed by a cover 57 secured to the wall of the casing by means of bolts 58, and sealed by a gasket 59. The inside of the cover 57 is recessed as at 61 to form a seat for one end of the compression coil spring 62. The opposite end of spring 62 is seated within a dished retainer 63, the outer side of which engages the shank 64 of the valve plunger 46.

A bellows or sylphon 65 surrounds the coil spring 62 and is preferably constructed of thin copper or brass for durability and flexibility. Opposite ends of the sylphon 65 are formed into generally axially extending flanges 66 and 67. Flange 66 is crimped around the outer edges of a bead 68 formed on the inside of the cover 57, and soldered thereto to provide a mechanical as well as a soldered joint having strength and also completely sealed against the passage of air therethrough. The flange 67 at the opposite end of the sylphon is crimped around the periphery of the retainer 63 and is also soldered thereto. Instead of providing a separate retainer 63, the sylphon 65 can be formed, if desired, with an integral end portion. The retainer 63 is formed with a central depression 69 acting as a pilot for the shank 64 of the valve plunger.

A boss 71 is formed on the cover 57, and has an inclined passage 72 extending therethrough and communicating with the vacuum chamber 70 formed by the cover 57, retainer 63 and sylphon 65. A conduit 73 extends from the passage 72 to the engine manifold (not shown).

Operation

As the load shaft 14 rotates, the fluid pump 33 generates pressure in the pressure chamber 36 which is transmitted through the passage 52 in the head 49 of the valve plunger 46 and is effective to urge the valve plunger to the left, as seen in Figure 2. This movement is resisted, however, by the compression coil spring 62. The effective pressure exerted by the spring 62 upon the valve plunger 46 is modified and reduced by the vacuum pressure in the vacuum chamber 70. The vacuum in this chamber tends to retract the retainer 63 against the action of the spring, and thus is effective to enable the valve plunger 46 to be moved to the left in the bore 47 with a smaller fluid pressure in the pressure chamber 36 than is necessary to move the valve plunger when there is no vacuum pressure in the chamber.

It is an inherent characteristic of the engine manifold vacuum pressure that it is at its maximum value when the engine is idling under no load or torque, and decreases progressively as engine torque increases. It will be seen from the chart shown in Figure 3 that the relationship between manifold vacuum and engine torque is substantially a straight line function for any given engine speed, decreasing from a value of 10 pounds per square inch at substantially no torque to a minimum value at the full engine torque of approximately 200 ft. lbs. for an average engine. This straight line relationship is substantially maintained during variations of engine speed, since for any given torque the maximum variation in manifold vacuum pressure throughout the normal speed range is only in the order of one-half lb. per square inch. These characteristics enable the engine vacuum to be utilized to effect the desired control of the fluid pressure for the most efficient and satisfactory operation of the transmission.

It will be apparent that as the vacuum pressure increases with a decrease in the torque, the valve plunger 46 will be moved by a smaller pump pressure to a position establishing communication between the pressure chamber 36 and the intake chamber 35. The arrangement is such that the valve plunger 46 "hunts" or fluctuates continually between its open and closed position. This results in maintaining a definite pressure in the pressure chamber 36, the value of which is determined by the strength of the spring 62 and the amount of vacuum pressure in the chamber 70. Thus there is always just sufficient fluid pressure in the system to operate the second and third speed clutches 21 and 23, respectively, under the particular torque then required. An easy or soft clutching engagement results and the automatic transition between different speed ratios is made smoothly.

Sudden changes in manifold vacuum pressure are prevented from causing abrupt operation of the pressure relief valve 45 by means of the passage 52 through the head 49 of the valve plunger 46, which functions as a dash pot to dampen the movement of the plunger.

A desirable feature of the pressure relief valve above described resides in the fact that only a minimum quantity of fluid need be obtained from the sump through the intake tube 34, since the hunting or fluctuation of the valve plunger 46 between its open and closed position permits a continual circulation of fluid between the pressure chamber 36 and the intake chamber 35. Thus a large proportion of the fluid capacity of the pump is obtained directly by recirculation through the intake chamber 35. This enhances cleanliness of the oil since the majority of the oil is not returned to the interior of the transmission casing.

It will be understood that the invention is not to be limited to the exact construction shown and described, but that various changes and modifications may be made without departing from the spirit and scope of the invention, as defined in the appended claims.

What is claimed is:

1. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation, a pump supplying activating fluid under pressure to said means, a pressure relief valve controlling the fluid pressure in said pump, and vacuum controlled means arranged to decrease the pressure at which said relief valve operates as the vacuum increases.

2. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation, a pump supplying activating fluid under pressure to said means, a pressure relief valve controlling the fluid pressure in said pump, and vacuum controlled means for varying the operation of said pressure relief valve.

3. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation, a pump supplying activating fluid under pressure to said means, a pressure relief valve controlling the fluid pressure in said pump, resilient means urging said valve toward closed position, and vacuum operated means arranged to decrease the resistance to movement of said valve toward open position.

4. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation, a pump supplying activating fluid under pressure to said means, a pressure relief valve controlling the fluid pressure in said pump, a coil spring resisting movement of said valve toward its open position, a source of vacuum pressure, and a vacuum chamber communicating with said source and having a movable part engageable with said valve and arranged to decrease the resistance to movement of the latter toward open position.

5. In a variable speed power transmission, in combination, a housing, a power shaft, a load shaft, gearing interposed between said power shaft and said load shaft and arranged for selective operation to transmit torque from said power shaft to said load shaft at a plurality of different speed ratios, fluid pressure means arranged to effect said selective operation, a pump supplying activating fluid under pressure to said means, a pressure relief valve controlling the fluid pressure in said pump, a coil spring resisting movement of said valve toward its open position, a source of vacuum pressure, a sylphon surrounding said coil spring and forming a chamber communicating with said source, said chamber having a movable wall operatively associated with said valve and decreasing the resistance to movement of the latter toward open position.

6. In a variable speed transmission, in combination, a housing, a power shaft, a load shaft, selectively operable gearing interposed between said power shaft and said load shaft for transmitting torque at a plurality of different speed ratios, a clutch arranged to shift said gearing between said speed ratios, fluid pressure means for operating said clutch, a pump for supplying fluid under pressure to said fluid pressure means to operate said clutch, said pump having pressure and intake chambers and a cylindrical bore adjacent said chambers, a reciprocable valve within said bore, said valve having passage means establishing communication between the pressure and intake chambers of the pump in the open position of the valve, said valve being movable toward said open position by the fluid pressure in said pressure chamber, resilient means opposing movement of said valve toward open position, and vacuum operated means for decreasing the resistance to movement of said valve toward open position, thereby rendering said valve operative at a lower fluid pressure.

7. The structure of claim 6 which is further characterized in that said vacuum operated means comprises a source of vacuum power, an expansible chamber communicating with said source, and means connecting said expansible chamber to said valve to modulate the operation of the latter.

8. The structure of claim 6 which is further characterized in that a coil spring opposes the movement of said valve toward its open position, and that said vacuum operated means comprises a source of vacuum power, an expansible chamber communicating with said source and enclosing said coil spring, and means connecting said expansible chamber to said valve to modulate the operation of the latter.

9. The structure of claim 6 which is further characterized in that said vacuum operated means comprises a removable bracket secured to said transmission housing, an expansible chamber carried by said bracket, said chamber having an end wall engaging said valve, and a source of vacuum power communicating with said chamber.

10. The structure of claim 6 which is further characterized in that said transmission housing has an opening in alignment with said valve, a cover plate secured to said transmission housing and closing said opening, an expansible sylphon mounted upon the inner side of the cover, a wall closing the opposite end of said sylphon, said wall engaging said valve, a coil spring within said sylphon having its opposite ends seated upon said cover and said wall, respectively, said cover having a passage thereto, and a source of vacuum pressure communicating with said passage.

11. In a variable speed power transmission, in combination, a housing, a power shaft, a load shaft, selectively operable gearing interposed between said power shaft and said load shaft for transmitting torque at a plurality of different speed ratios, a clutch for effecting said selective operation, fluid pressure means arranged to operate said clutch, a pump for supplying activating fluid under pressure to said means, a reciprocable pressure relief valve for regulating the pressure supplied by said pump, spring means for moving said valve to closed position and vacuum operated means for decreasing the resistance to movement of said valve toward open position, said valve having a head reciprocable in an enclosed chamber and an axial passage extending through said head to dampen the reciprocation of said valve.

12. In a variable speed mechanism, in combination, an engine, variable speed gearing driven by said engine, clutch means arranged to effect different speed ratios within said gearing, fluid pressure means arranged to actuate said clutch means, a pump having an inlet passage and an outlet passage, a pressure relief valve in said outlet passage arranged to bypass fluid pressure to said inlet passage, and a device associated with said relief valve and responsive to engine vacuum to regulate the bypassing of fluid by said relief valve.

13. In a variable speed mechanism, in combination, an engine, variable speed gearing driven by said engine, clutch means arranged to effect different speed ratios within said gearing, fluid pressure means arranged to actuate said clutch means, a pump having an inlet passage and an outlet passage, a pressure relief valve in said outlet passage arranged to bypass fluid pressure over a predetermined amount to said inlet passage, an expansible chamber operative upon said relief valve to regulate the pressure at which fluid is bypassed to said inlet passage, and means for supplying engine vacuum to said chamber.

14. In combination with a variable speed transmission mechanism embodying fluid pressure operated clutch elements, a pump housing, a pump within said housing having an inlet passage connected to a fluid source and an outlet passage arranged to supply fluid under pressure to operate said clutch elements, a pressure relief valve mounted in said pump housing arranged to bypass fluid from said outlet passage to said inlet passage, and vacuum operated means for varying the pressure at which said pressure relief valve bypasses fluid to said inlet passage.

15. In combination with a variable speed transmission mechanism embodying fluid pressure operated clutch elements, a pump housing, a pump within said housing having an intake chamber connected to a fluid source and a pressure chamber arranged to supply fluid under pressure to operate said clutch elements, a pressure relief valve mounted in said pump housing and arranged to establish temporary communication between said pressure and intake chambers when the pressure in said pressure chamber exceeds a predetermined amount, and vacuum operated means acting upon said pressure relief valve to vary the pressure at which communication is established between said pressure and intake chambers.

EUGENE J. FARKAS.
JOSEPH W. RACKLE.

REFERENCES CITED

The following references are of record in the file of this patent:

UNITED STATES PATENTS

| Number | Name | Date |
|---|---|---|
| 2,193,305 | Thompson | Mar. 12, 1940 |
| 2,205,470 | Dunn | June 25, 1940 |
| 2,221,393 | Carnegie | Nov. 12, 1940 |
| 2,263,091 | Johnson | Nov. 18, 1941 |
| 2,282,949 | Dolza | May 12, 1942 |
| 2,299,079 | Davis | Oct. 20, 1942 |